United States Patent
Yoshikawa

(10) Patent No.: US 7,388,615 B2
(45) Date of Patent: Jun. 17, 2008

(54) LENS APPARATUS ALLOWING CHANGING USER SETTINGS TO STANDARD SETTINGS

(75) Inventor: Kazumasa Yoshikawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 447 days.

(21) Appl. No.: 11/098,269

(22) Filed: Apr. 4, 2005

(65) Prior Publication Data

US 2005/0225660 A1    Oct. 13, 2005

(30) Foreign Application Priority Data

Apr. 9, 2004    (JP)    ............... 2004-115599

(51) Int. Cl.
H04N 5/225    (2006.01)

(52) U.S. Cl. ...................... 348/360; 348/335

(58) Field of Classification Search ......... 348/360–361, 348/335; 396/72, 429, 544, 529
See application file for complete search history.

(56) References Cited

U.S. PATENT DOCUMENTS

| | | | |
|---|---|---|---|
| 6,035,137 A | 3/2000 | Kaneko | |
| 6,036,137 A | 3/2000 | Myren | |
| 6,683,652 B1 * | 1/2004 | Ohkawara et al. | ............ 348/347 |
| 6,727,940 B1 | 4/2004 | Oka | |
| 7,148,928 B2 * | 12/2006 | Minakuti et al. | ............ 348/360 |
| 2001/0030707 A1 * | 10/2001 | Fujii | ............ 348/335 |
| 2001/0055481 A1 | 12/2001 | Yoshikawa | |
| 2005/0225660 A1 * | 10/2005 | Yoshikawa | ............ 348/335 |

FOREIGN PATENT DOCUMENTS

| | | |
|---|---|---|
| EP | 0737005 | 10/1996 |
| JP | 2000-106671 | 4/2000 |
| JP | 2001-124979 A | 5/2001 |

* cited by examiner

*Primary Examiner*—Ho Tuan
(74) *Attorney, Agent, or Firm*—Canon U.S.A. Inc I.P. Div

(57) ABSTRACT

A lens apparatus includes a changing unit for changing a user-specified value in a user-specified data segment to a standard set value at any screen state of a display panel. Therefore, a setting information element for each function regarding image capture in the lens apparatus is changed to a standard setting information element by a particular operation. As a result, problems, such as the activation of an undesired function upon the operation of a switch on a drive unit, and the like, are solved.

4 Claims, 9 Drawing Sheets

| 301 | Optical focus-lens system | 312 | Iris-diaphragm controlling unit |
| 302 | Focus-lens motor | 313 | Optical extension system |
| 303 | Focus-position detecting unit | 314 | Extension motor |
| 304 | Focus controlling unit | 315 | Extension position detecting unit |
| 305 | Optical zoom-lens system | 316 | Extension controlling unit |
| 306 | Zoom-lens motor | 317 | CPU |
| 307 | Zoom-position detecting unit | 318 | Storing unit |
| 308 | Zoom controlling unit | 319 | Switch communication unit |
| 309 | Iris-diaphragm blades | 320 | Data communication unit |
| 310 | Iris-diaphragm motor | 321 | Command communication unit |
| 311 | Iris-diaphragm position detecting unit | 322 | Camera communication unit |

FIG. 4

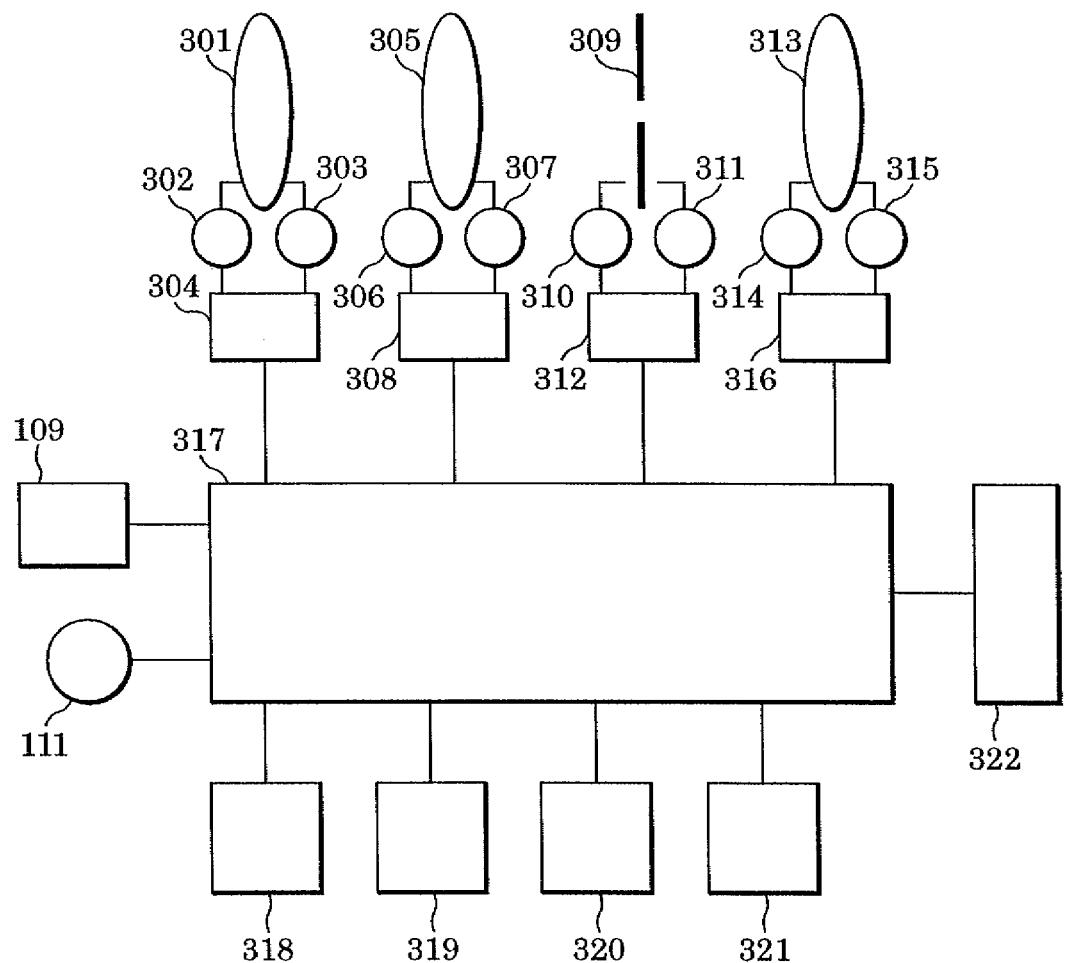

| 301 | Optical focus-lens system | 312 | Iris-diaphragm controlling unit |
| 302 | Focus-lens motor | 313 | Optical extension system |
| 303 | Focus-position detecting unit | 314 | Extension motor |
| 304 | Focus controlling unit | 315 | Extension position detecting unit |
| 305 | Optical zoom-lens system | 316 | Extension controlling unit |
| 306 | Zoom-lens motor | 317 | CPU |
| 307 | Zoom-position detecting unit | 318 | Storing unit |
| 308 | Zoom controlling unit | 319 | Switch communication unit |
| 309 | Iris-diaphragm blades | 320 | Data communication unit |
| 310 | Iris-diaphragm motor | 321 | Command communication unit |
| 311 | Iris-diaphragm position detecting unit | 322 | Camera communication unit |

LENS APPARATUS ALLOWING CHANGING USER SETTINGS TO STANDARD SETTINGS

CROSS-REFERENCE TO RELATED APPLICATIONS

This application is related to U.S. patent application No. 11/098,270, entitled "Lens Apparatus," filed Apr. 4, 2005, which is incorporated in its entirety by reference herein.

BACKGROUND OF THE INVENTION

1. Field of the Invention

The present invention relates to an image capturing unit used in a television lens for use in television image capture, the television lens including a lens apparatus and a camera device attached to the lens apparatus.

2. Description of the Related Art

An optical apparatus for use in television image capture includes a television camera body and a television lens apparatus, and when the optical apparatus is used, the television lens apparatus is attached to the television camera body. The television lens apparatus mainly includes a lens body unit and a drive unit. The lens body unit includes an optical image-capturing system and a manual ring for manually operating the optical image-capturing system. The drive unit contains a motor, a control substrate, and a central processing unit (CPU), all used for electrically driving the manual ring. On the outside of the drive unit, various switches and operating members, both used for providing instructions for electrical control, are disposed. The television image capture by means of the television lens apparatus used to be performed mainly by a manual zoom and a manual aperture setting, but it has been frequently carried out by using an electrical servomotor. As a result, diverse functions are added to the drive unit (see Japanese Patent No. 3420542).

Examples of such functions include a preset function that moves a zoom lens with a motor upon the pressing of a switch up to a position that was stored by a user and a function that assigns this preset function to a desired switch that is freely selected by a user from plural switches disposed on a drive unit.

In order to set these diverse functions, an optical apparatus including a function-setting unit for setting the functions regarding image capture in a lens apparatus, a display panel used for setting the functions, and a storing unit capable of storing a plurality of setting information elements for the individual functions has been proposed. Such an optical apparatus allows a user to grasp settings easily and quickly and has improved usability resulting from increased ease of use of the function-setting unit.

These functions set in this manner can extend the range of image capture performed by photographers and realize an optimal camera work selected in accordance with various image-capturing conditions.

Such an optical apparatus, which is used for television image capture and includes the television camera body and the television lens apparatus, is mostly owned by a broadcast station or an agency, not by an individual, and therefore, the optical apparatus is often used by different photographers, who can individually set various settings. As a result, when a first photographer determines a setting of the optical apparatus and then a second photographer uses the optical apparatus, a problem arises in which the second photographer may encounter the operation of an undesired function when, for example, operating a switch on the drive unit.

Most of the television image capture is unexpectedly started in order to seize an opportunity to capture a critical image. In these cases, the problem described above is prone to lead to missing such an opportunity.

According to the present invention, a setting information element for each function regarding image capture in a television lens apparatus is changed to a standard setting information element by a particular operation, so that problems, such as the operation of an undesired function upon the push of a switch on a drive unit, and the like, are solved.

SUMMARY OF THE INVENTION

The present invention is directed to a lens apparatus. In one aspect, a lens apparatus driving an optical device includes a storing unit including a user-specified data segment storing a user-specified value, and an initial set data segment storing an initial set value, wherein the user-specified value is rewritten based on the initial set value extracted from the initial set data segment; a display panel having a screen facilitating changing the user-specified value; and a changing unit configured to change the user-specified value in the user-specified data segment to a standard set value at any screen state of the display panel.

According to the present invention, a setting information element for each function regarding image capture in a lens apparatus is changed to a standard setting information element by a particular operation, so that problems, such as the activation of an undesired function upon the operation of a switch on a drive unit, and the like, are solved.

Further features and advantages of the present invention will become apparent from the following description of exemplary embodiments with reference to the attached drawings.

BRIEF DESCRIPTION OF THE DRAWINGS

FIG. 4 is a block diagram of the television lens apparatus according to the first embodiment.

DESCRIPTION OF THE EMBODIMENTS

The embodiments of the present invention are described below. However, the present invention is not limited to the embodiments.

First Embodiment

Figure 1:
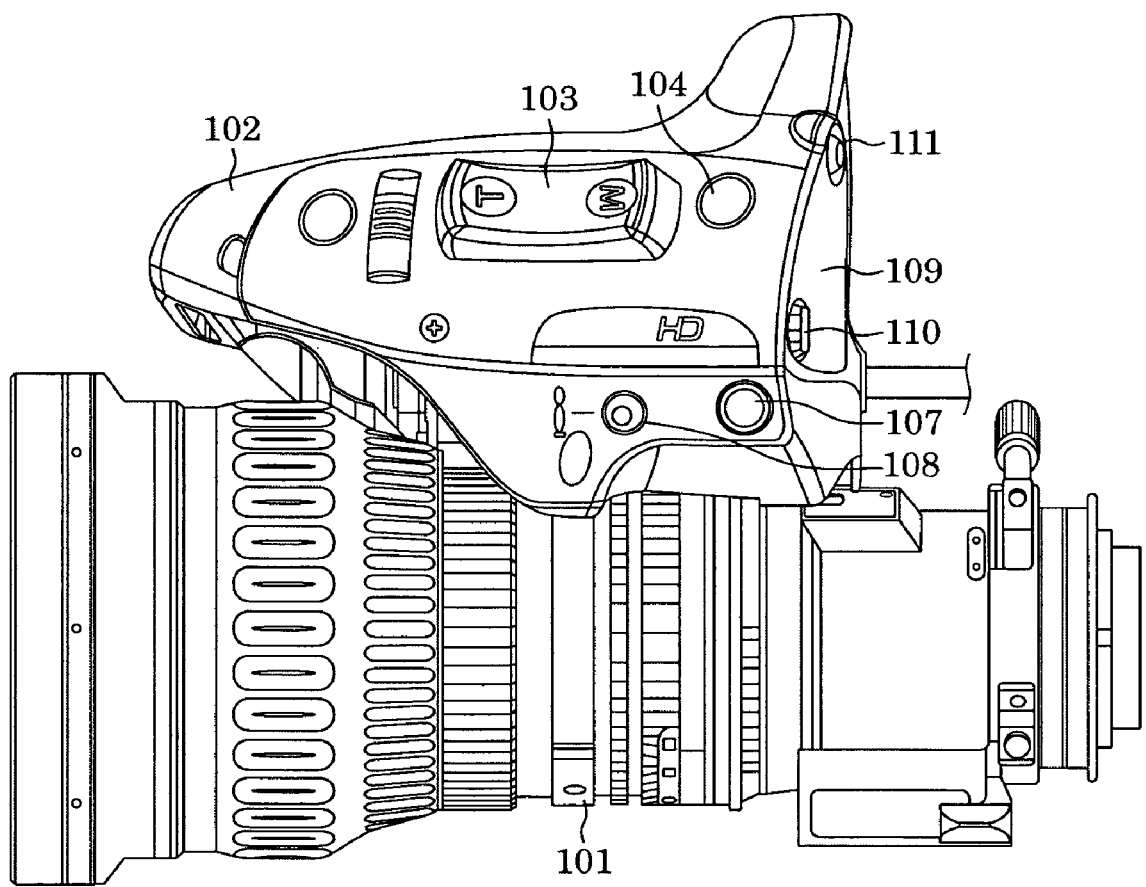
FIG. 1 is a top view of a television lens apparatus according to a first embodiment of the present invention.
Figure 2:
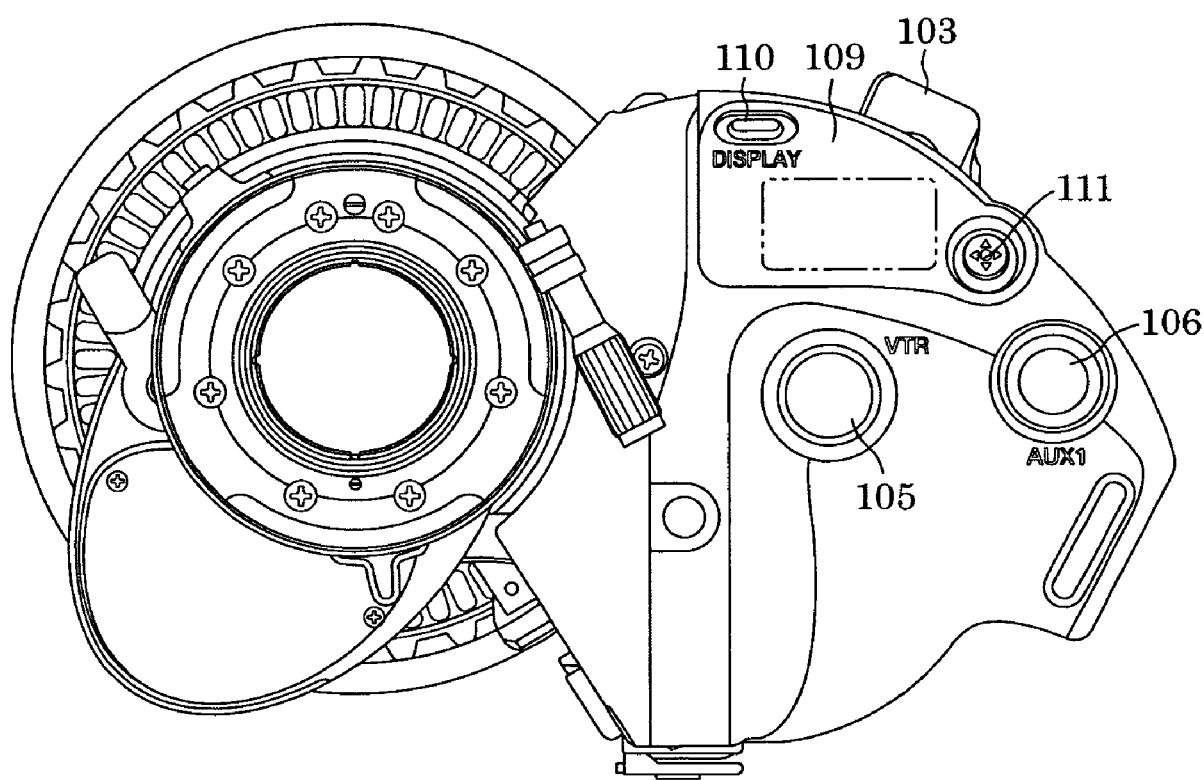
FIG. 2 is a back view of the television lens apparatus according to the first embodiment.

The first embodiment is described below with reference to the drawings. FIG. 1 is a top view of a television lens apparatus, and FIG. 2 is a back view of the television lens apparatus. A lens body unit 101 contains an optical image-capturing system disposed therein and includes a manual ring disposed on the outside thereof, the manual ring being used for manually operating focusing, zooming, and an iris diaphragm. A drive unit 102 is attached to the lens body unit 101 so as to be freely attachable to and detachable from the lens body unit 101, and contains a motor, a control substrate, and a CPU, all used for electrically driving the manual ring, disposed therein. A seesaw switch 103 is used for driving zoom operation by a servomechanism. When the seesaw switch 103 is pressed down in the direction of "T" or "W" shown in FIG. 1, the zoom mode is shifted to a telephoto position or a wide-angle position at a speed according to the amount of pressing. A return switch 104 is used for returning a signal to a television camera body in accordance with the operation of this switch. A VTR (recording start/stop) switch 105 functions as a trigger for recording. The seesaw switch 103, the return switch 104, and the VTR switch 105 are the most basic switches relating to television image capture, and their positions, as shown in FIG. 1, remain unchanged for long periods of time for the sake of usability.

A function switch A 106 is capable of accepting one assigned function selected from various functions regarding image capture in the lens apparatus. For example, when a preset function is assigned to the function switch A 106, a photographer (user) can store a current position of a zoom lens by simultaneously pressing the function switch A 106 and a memory switch 108, which is described later. Then, the zoom lens is reset to the stored position from any position at the pressing of the function switch A 106. A function switch B 107 is capable of accepting one assigned function selected from various functions regarding image capture in the lens apparatus. For example, when a function of reciprocating the zoom lens at the pressing of a switch is assigned to the function switch B 107, a user can move the zoom lens up to the end of a telephoto position so as to zoom in on a subject and to focus at a telephoto position with a shallow depth by holding down the function switch B 107, and then, the user can reset the zoom lens to the original zoom position by releasing the function switch B 107. This function assists the user in focusing. In order to prevent the zoom lens from moving unintentionally upon a user's misoperation of the function switch A 106 or the function switch B 107 in manual operation, the function switch A 106 and the function switch B 107 may be set such that the pressing of the function switch A 106 or function switch B 107 does not activate the assigned function. The memory switch 108 is used for storing a current zoom position, speed, direction, and the like.

A liquid-crystal display panel 109 is disposed on the back side of the drive unit 102. A display switch 110 is used for switching the display panel 109 between the on and off states. The display panel 109 is in the on state only when required so that power consumption is reduced. A function-setting switch 111 is used for setting various functions regarding image capture in the lens apparatus.

Figure 3:
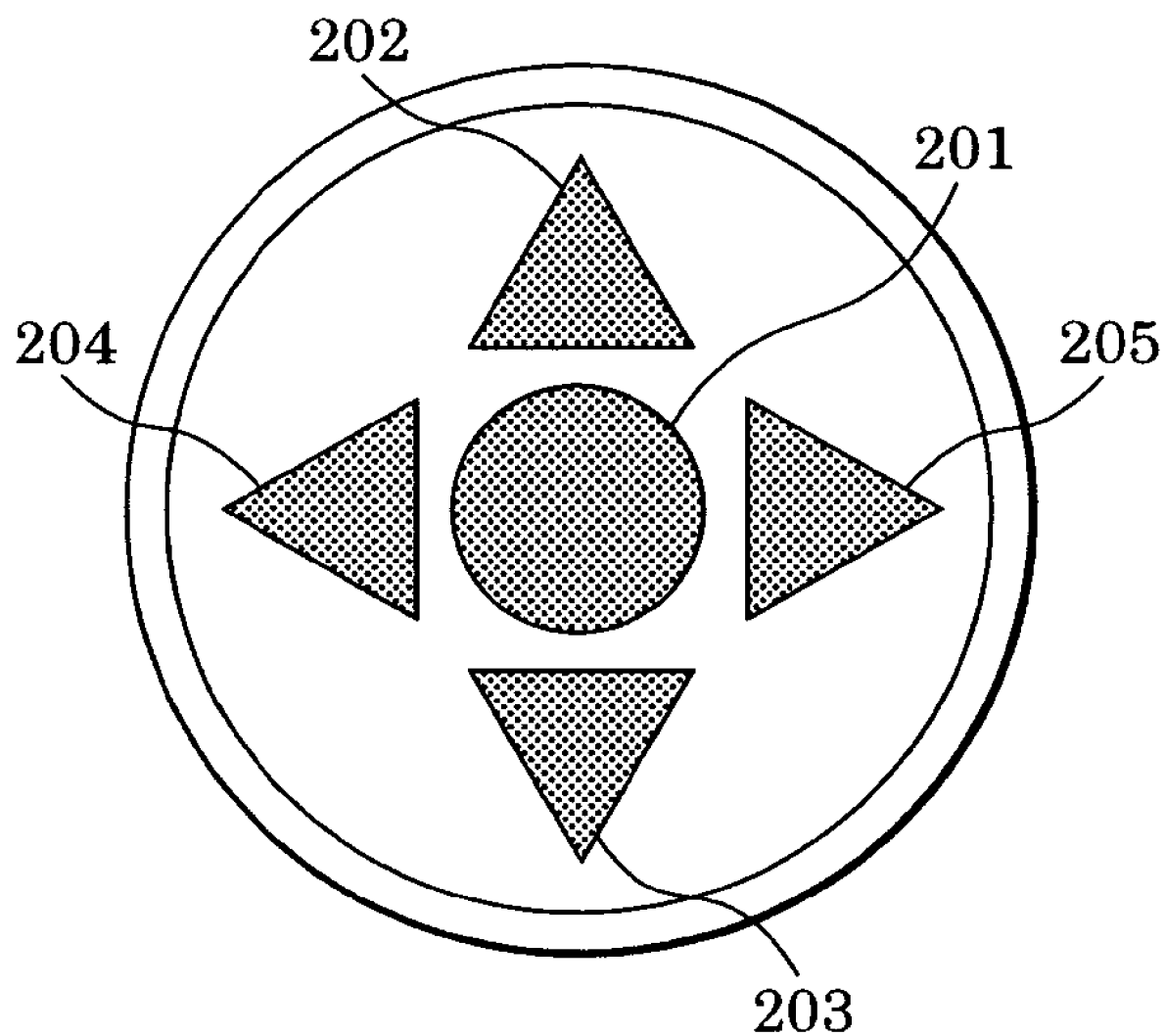
FIG. 3 is an enlarged view of a function-setting switch of the television lens apparatus according to the first embodiment.

FIG. 3 is an enlarged view of the function-setting switch 111. The function-setting switch 111 is made up of four arrow keys 202 to 205 and a selection key 201. A user can move a cursor using the four arrow keys 202 to 205 in a hierarchical menu appearing on the display panel 109 and can select one function from a plurality of functions. A user can accept the selection by pressing the selection key 201.

Next, the internal structure of the lens body unit 101 is described with reference to FIG. 4.

FIG. 4 shows an optical focus-lens system 301 for adjusting a focus; a focus-lens motor 302 for driving the optical focus-lens system 301; a focus-position detecting unit 303 for outputting a position signal corresponding to a position of the optical focus-lens system 301; a focus controlling unit 304 for controlling the optical focus-lens system 301; an optical zoom-lens system 305 for zooming adjustment; a zoom-lens motor 306 for driving the-optical zoom-lens system 305; a zoom-position detecting unit 307 for outputting a position signal corresponding to a position of the optical zoom-lens system 305; a zoom controlling unit 308 for controlling the optical zoom-lens system 305; iris-diaphragm blades 309 for adjusting an aperture; an iris-diaphragm motor 310 for driving the iris-diaphragm blades 309; an iris-diaphragm position detecting unit 311 for outputting a position signal corresponding to a position of the iris-diaphragm blades 309; an iris-diaphragm controlling unit 312 for controlling the iris-diaphragm blades 309; an optical extension system 313 for magnifying a focal length by two times, one-and-a-half times, or the like; an extension motor 314 for driving the optical extension system 313; an extension position detecting unit 315 for outputting a position signal corresponding to a position of the optical extension system 313; an extension controlling unit 316 for controlling the optical extension system 313; a CPU 317 serving as control of the television lens apparatus according to this embodiment; the liquid-crystal display panel 109 disposed on the back side of the drive unit 102; the function-setting switch 111 for setting various functions regarding image capture in the lens apparatus; a storing unit 318 for storing the various functions and characteristics regarding image capture in the lens apparatus; a switch communication unit 319 mounted to the drive unit 102; a data communication unit 320 for communicating to the outside of the lens system; a command communication unit 321 for communicating various commands; and a camera communication unit 322 for communicating with the television camera body.

Figure 5:
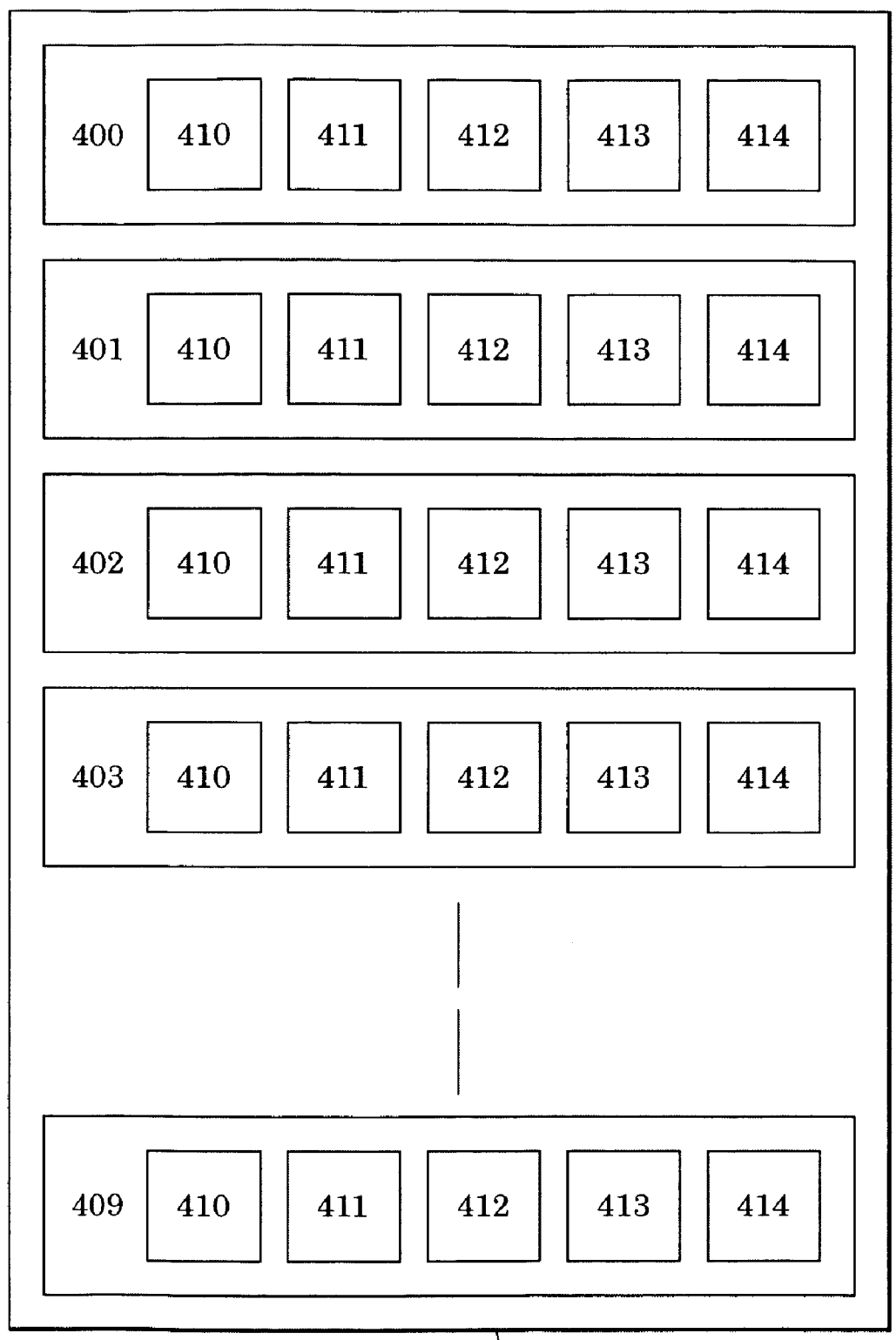
FIG. 5 shows the internal structure of storing means of the television lens according to the first embodiment.

FIG. 5 shows the internal structure of the storing unit 318. As shown in FIG. 5, the storing unit 318 is divided into a plurality of user areas 400 to 409 for a plurality of users. Each area has five assigned function-setting sections 410 to 414 consisting of a function-assignment information section 410 storing information indicting an assigned function for the switches disposed on the drive unit 102; a preset operation information section 411 storing information indicating the characteristics of preset operation; an iris operation information section 412 storing information indicating the characteristics of iris operation; a zoom operation information section 413 storing information indicating the characteristics of zoom operation; and a focusing operation information section 414 storing information indicating the characteristics of focusing operation. Each of these five function-setting sections 410 to 414 is capable of being set by individual user areas with the use of the display panel 109 and the function-setting switch 111. The user area 400 is defined as a non-rewritable user area dealing with a standard setting information element.

Figure 6:
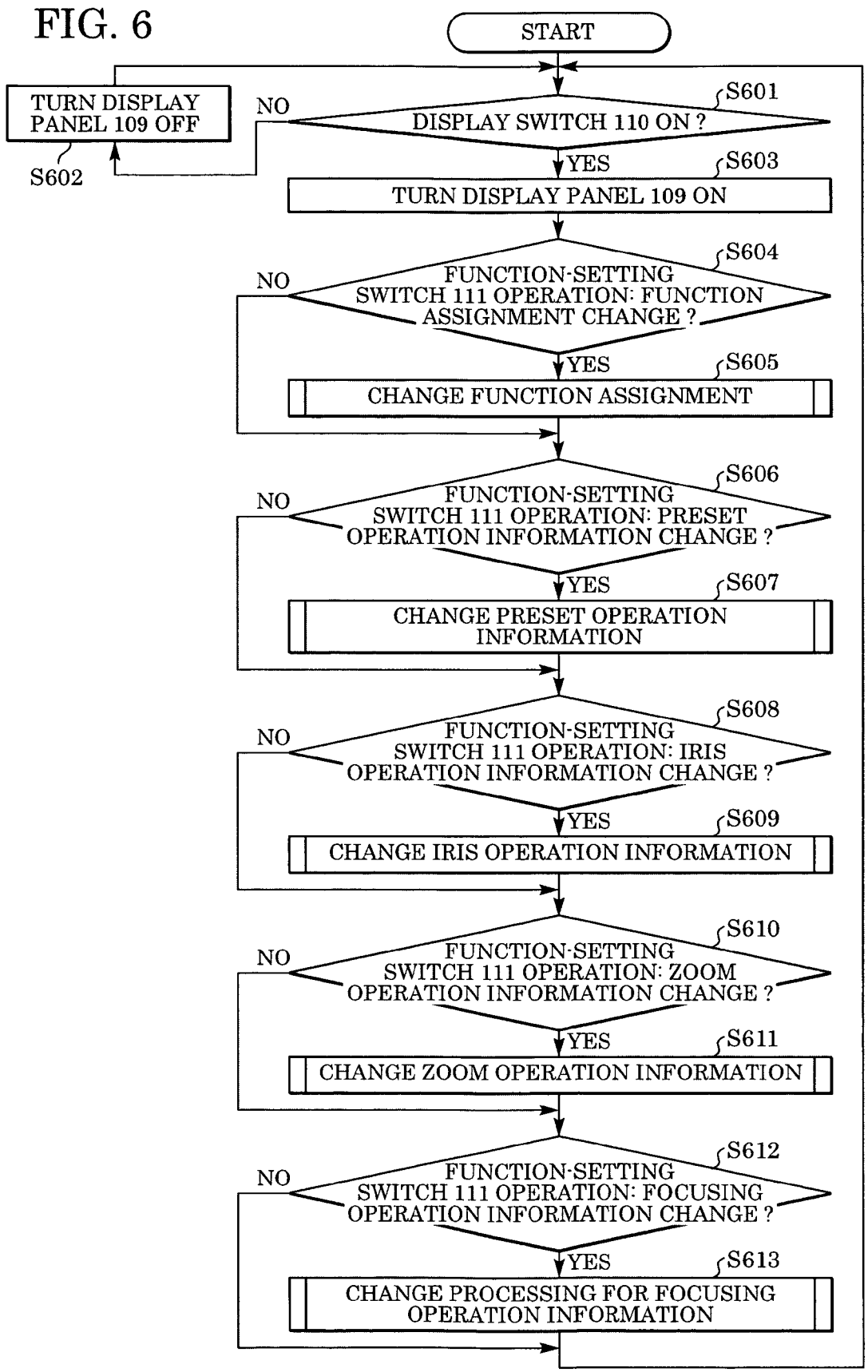
FIG. 6 is a flow chart of the operation on a screen of a display panel of the television lens apparatus according to the first embodiment.

Next, in the structure described above, a method for setting a function regarding the operating characteristics of the lens system, the writing operation on the storing unit 318, and the changing operation are described with reference to FIG. 6.

In step S601, it is determined whether the display switch 110 is switched to the ON position. If the display switch 110 is determined not to be switched to the ON position, the display panel 109 is turned off (step S602). If the display switch 110 is determined to be switched to the ON position, the display panel 109 is turned on (step S603), and the processing then moves to step S604. In step S604, it is determined whether the function-setting switch 111 is operated so that function assignment to the switches disposed on the drive unit 102 is changed. If the function-setting switch 111 is operated as so, the changing of the function assignment to the relevant switch is completed (step S605), and the processing then moves to step S606. If the function-setting switch 111 is not operated as so, the processing goes directly to step S606. In step S606, it is determined whether the function-setting switch 111 is operated so that preset operation information is changed. If the function-setting switch 111 is operated as so, the changing of the preset operation information is completed (step S607), and the processing then moves to step S608. If the function-setting switch 111 is not operated as so, the processing goes directly to step S608. In step S608, it is determined whether the function-setting switch 111 is operated so that iris operation information is changed. If the function-setting switch 111 is operated as so, the changing of the iris information is completed (step S609), and the processing then moves to step S610. If the function-setting switch 111 is not operated as so, the processing goes directly to step S610. In step S610, it is determined whether the function-setting switch 111 is operated so that zoom operation information is changed. If the function-setting switch 111 is operated as so, the changing of the zoom operation information is completed (step S611), and the processing then moves to step S612. If the function-setting switch 111 is not operated as so, the processing goes directly to step S612. In step S612, it is determined whether the function-setting switch 111 is operated so that focusing operation information is changed. If the function-setting switch 111 is operated as so, the changing of the focusing operation information is completed (step S613), and the processing then moves back to step S601. If the function-setting switch 111 is not operated as so, the processing goes back to step S601.

Figure 7:
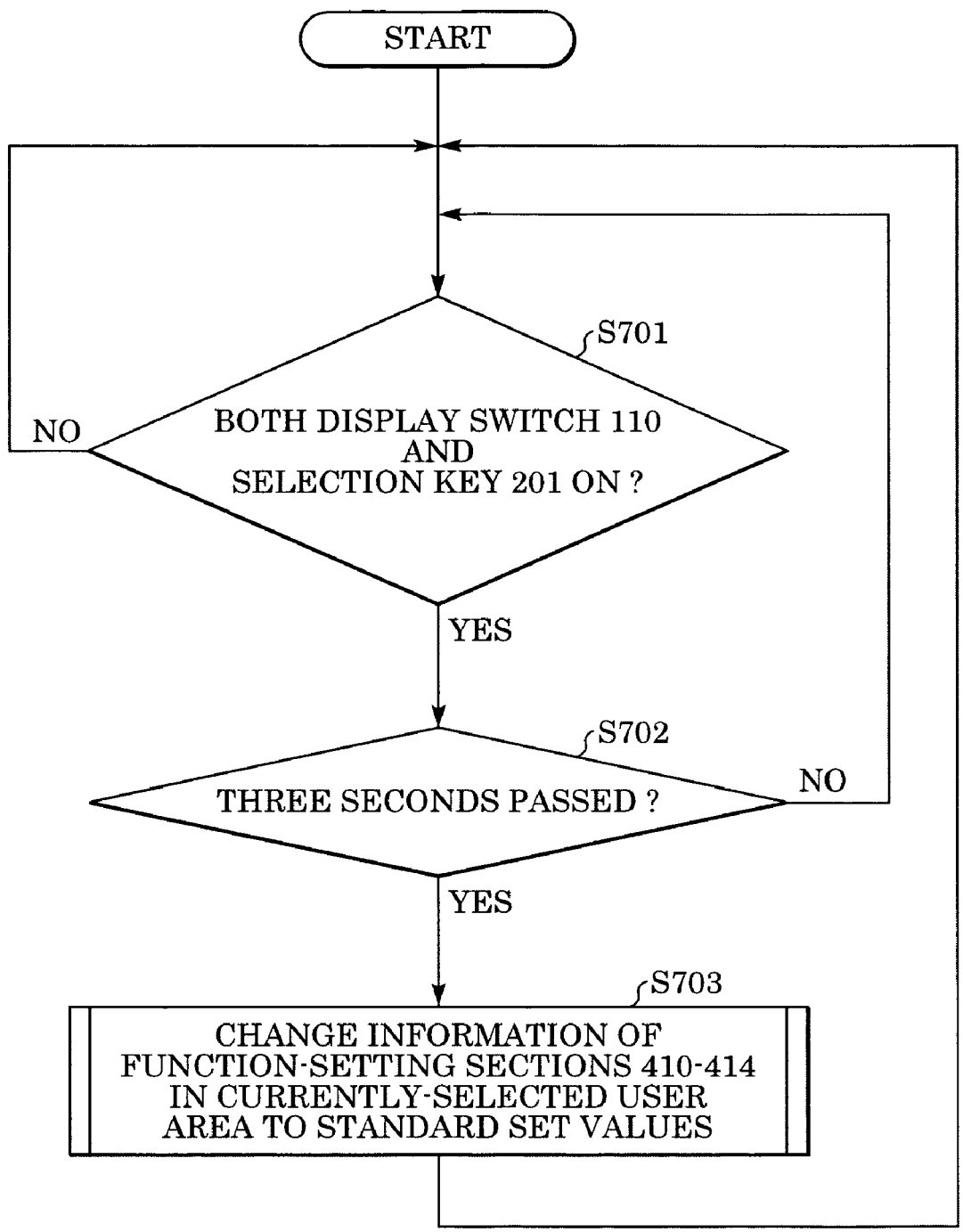
FIG. 7 is a flow chart of the operation of changing a setting information element in a function-setting section to a standard setting information element in the television lens apparatus according to the first embodiment.

Next, the operation of changing setting information elements in the function-setting sections of the user areas to the standard setting information elements is described with reference to FIG. 7.

In step S701, it is determined whether both the display switch 110 and the selection key 201 are in the ON state. If the display switch 110 is in the ON state and the selection key 201 is not, the processing goes to the start of step S701. If both are in the ON position, the processing moves to step S702. In step S702, it is determined whether the state in which both the display switch 110 and the selection key 201 are in the ON position has lasted for at least three seconds. If the state has not lasted for three seconds, the processing goes back to step S701. If the state has lasted for three seconds, the processing moves to step S703. In step S703, information elements of the function-setting sections 410 to 414 in a currently-selected user area is changed to the standard setting information elements of the function-setting sections 410 to 414 in the user area 400, and the processing then moves back to step S701.

In the first embodiment, the operation required for changing the setting information elements for the functions is pressing and holding both the display switch and the selection key simultaneously at least for three seconds. However, another operation, including operation using another switch, is applicable.

In the first embodiment, the changing of the setting information elements for the functions to the standard setting information elements is performed on only the currently-selected user area. However, such a changing operation may be performed on all the user areas except the user area 400.

In the first embodiment, the function-setting switch includes the four arrow keys in a cross arrangement. However, the function-setting switch may be of any shape, including a jog-shuttle type, as long as functions can be set according to a flow appearing on the display panel.

Additionally, the display panel and the function-setting switch disposed on the drive unit in the first embodiment may be arranged at any position of the television lens apparatus composed of the lens body unit and the drive unit.

According to the present invention, a setting information element for each function regarding image capture in a television lens apparatus is changed to a standard setting information element by a particular operation, so that problems, such as the activation of an undesired function upon the operation of a switch on a drive unit, and the like, are solved.

Second Embodiment

In the first embodiment, all the setting information elements for the functions are changed to the standard setting information elements. However, only preset information indicating a preset position, a preset speed, and a preset direction contained in information stored in the preset operation information section may be changed to standard setting information.

The second embodiment is described below with reference to the drawings. The structure of the second embodiment is the same as that shown in FIGS. 1 to 4 and 6 for the first embodiment, and the explanation thereof is omitted. The internal structure of the storing unit 318 and the operation of changing a setting information element stored in a function-setting section in a user area to a standard setting information element are different from the first embodiment, and the explanation thereof is described below.

Figure 8:
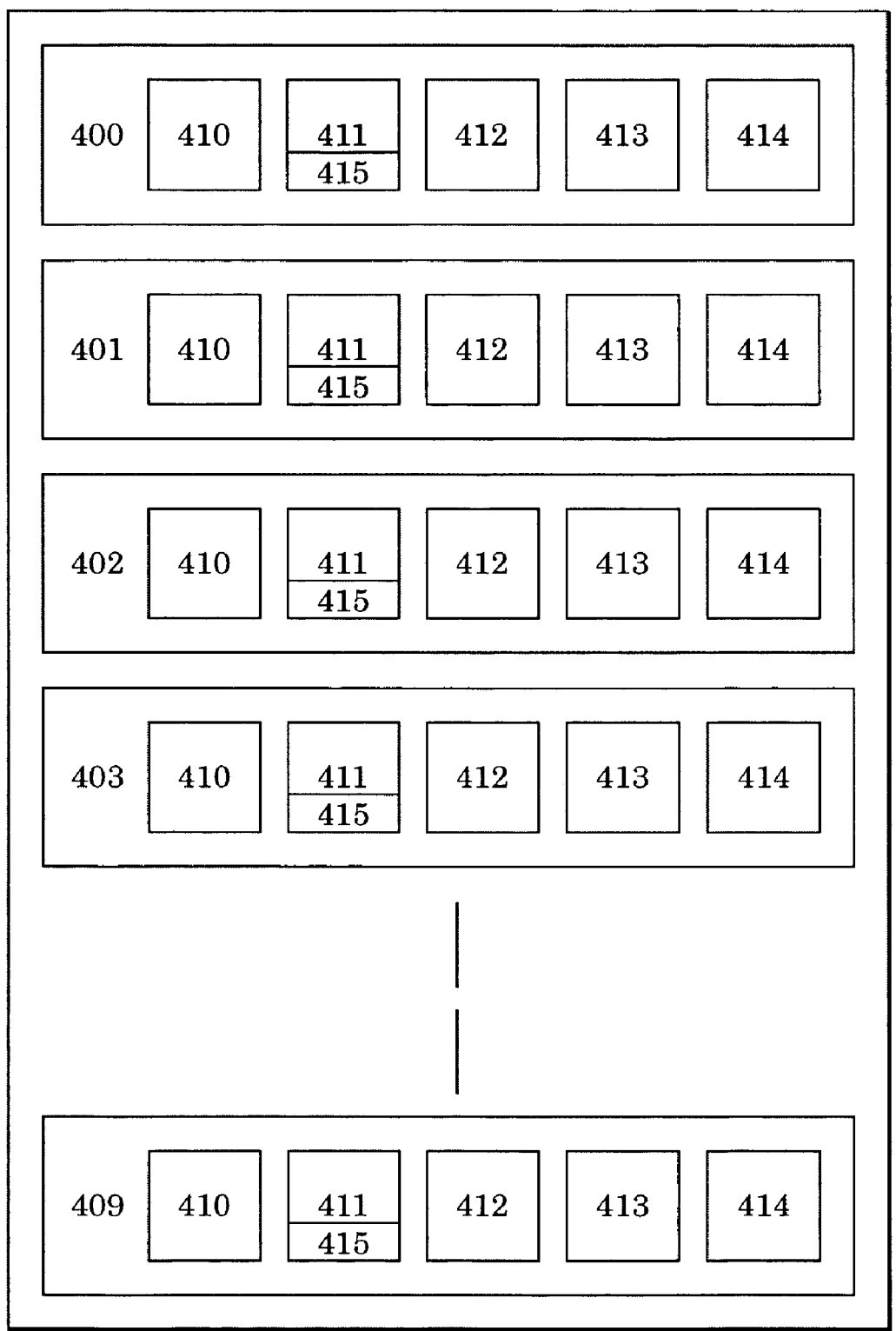
FIG. 8 shows the internal structure of the storing means of the television lens apparatus according to a second embodiment.

FIG. 8 shows the internal structure of the storing unit 318. In FIG. 8, the sections 400 to 414 are the same as those in the first embodiment, and the explanation thereof is omitted. A preset information portion 415 contained in the preset operation information section 411 stores the preset information indicating a preset position, a preset speed, a preset direction, and like.

Figure 9:
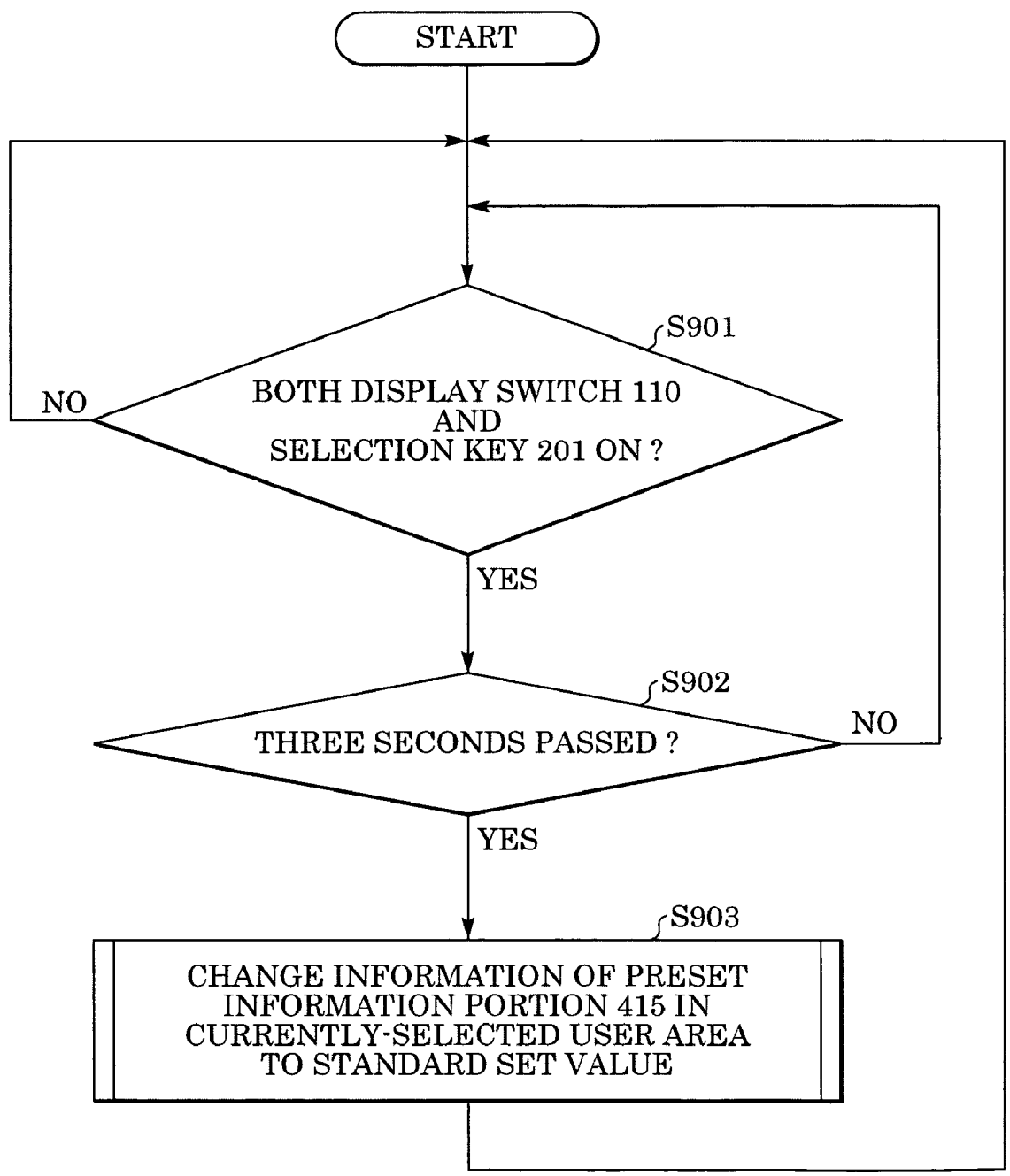
FIG. 9 is a flow chart of the operation of changing a setting information element in a function-setting section to a standard setting information element in the television lens apparatus according to the second embodiment.

The operation of changing a setting information element stored in a function-setting section in a user area to a standard setting information element in the structure explained above is described with reference to FIG. 9.

In step S901, it is determined whether both the display switch 110 and the selection key 201 are in the ON state. If the display switch 110 is in the ON state and the selection key 201 is not, the processing goes to the start of step S901. If both are in the ON position, the processing moves to step S902. In step S902, it is determined whether the state in which both the display switch 110 and the selection key 201 are in the ON position has lasted for about three seconds. If the state has not lasted for three seconds, the processing goes back to step S901. If the state has lasted for three seconds, the processing goes to step S903. In step S903, the preset information contained in the preset information portion 415 in a currently-selected user area is changed to standard setting information contained in the preset information portion 415 in the user area 400, and the processing then moves back to step S901.

The preset information is changed to the standard setting information in the second embodiment. However, other setting information may be changed to standard setting information.

In the second embodiment, the operation required for changing the preset information to the standard setting information is pressing and holding both the display switch and the selection key simultaneously for at least three seconds. However, another operation, including operation using another switch, is applicable.

In the second embodiment, the changing of the preset information to the standard setting information is performed on only the currently-selected user area. However, such a changing operation may be performed on all the user areas except the user area 400.

In the second embodiment, the function-setting switch includes the four arrow keys in a cross arrangement. However, the function-setting switch may be of any shape, including a jog-shuttle type, as long as functions can be set according to a flow appearing on the display panel.

Additionally, the display panel and the function-setting switch disposed on the drive unit in the second embodiment may be arranged at any position of the television lens apparatus composed of the lens body unit and the drive unit.

According to the present invention, a setting information element for each function regarding image capture in a television lens apparatus is changed to a standard setting information element by a particular operation. Therefore, problems, such as the activation of an undesired function upon the operation of a switch on a drive unit, and the like, are solved.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-115599 filed Apr. 9, 2004, which is hereby incorporated by reference herein.

What is claimed is:

1. A lens apparatus driving an optical device, comprising:
   a storing unit including a user-specified data segment storing a user-specified value, and an initial set data segment storing an initial set value, wherein the user-specified value is rewritten based on the initial set value extracted from the initial set data segment;
   a display panel having a screen facilitating changing the user-specified value; and
   a changing unit configured to change the user-specified value in the user-specified data segment to a standard set value at any screen state of the display panel,
   wherein only a user-specified value regarding preset information in the user-specified data segment is capable of being changed to the standard set value by the changing unit.

2. A lens apparatus driving an optical device, comprising:
   a storing unit including a user-specified data segment storing a user-specified value, and an initial set data segment storing an initial set value, wherein the user-specified value is rewritten based on the initial set value extracted from the initial set data segment;
   a display panel having a screen facilitating changing the user-specified value; and
   a changing unit configured to change the user-specified value in the user-specified data segment to a standard set value at any screen state of the display panel,
   wherein the user-specified data segment includes a plurality of user-specified data segments, and
   wherein only a user-specified value regarding preset information in the user-specified data segment is capable of being changed to the standard set value by the changing unit.

3. A lens apparatus driving an optical device, comprising:
   a storing unit including a user-specified data segment storing a user-specified value, and an initial set data segment storing an initial set value, wherein the user-specified value is rewritten based on the initial set value extracted from the initial set data segment;
   a display panel having a screen facilitating changing the user-specified value; and
   a changing unit configured to change the user-specified value in the user-specified data segment to a standard set value at any screen state of the display panel,
   wherein the changing unit changes the user-specified value in the user-specified data segment by a changing operation different from a normal image capturing operation, and
   wherein only a user-specified value regarding preset information in the user-specified data segment is capable of being changed to the standard set value by the changing unit.

4. A lens apparatus driving an optical device, comprising:
   a storing unit including a user-specified data segment storing a user-specified value, and an initial set data segment storing an initial set value, wherein the user-specified value is rewritten based on the initial set value extracted from the initial set data segment;
   a display panel having a screen facilitating changing the user-specified value;
   a changing unit configured to change the user-specified value in the user-specified data segment to a standard set value at any screen state of the display panel; and
   a switch operable by a user to change the user-specified value in the user-specified data segment,
   wherein only a user-specified value regarding preset information in the user-specified data segment is capable of being changed to the standard set value by the changing unit.

* * * * *